March 27, 1951     E. W. PETERSON     2,546,776
ANTIBACKLASH ATTACHMENT FOR FISHING REELS
Filed Sept. 17, 1949

Inventor
Edward W. Peterson,
Barthel & Bugbee
Attorneys

Patented Mar. 27, 1951

2,546,776

UNITED STATES PATENT OFFICE 2,546,776

ANTIBACKLASH ATTACHMENT FOR FISHING REELS

Edward W. Peterson, Detroit, Mich.

Application September 17, 1949, Serial No. 116,239

1 Claim. (Cl. 242—84.5)

This invention relates to fishing reels, and in particular, to anti-backlash devices for fishing reels.

Hitherto, the prevention of backlash in the casting of fish baits or lures has been a problem to an unskilled fisherman. This backlash causes the line to tangle upon the reel in a confused snarl, resulting from the spool overrunning the line as the latter leaves the reel, a snarl appropriately labelled a "bird's nest" because of its confused appearance. Certain prior reels have had so-called anti-backlash mechanism built into them for the purpose of preventing such snarls, but these devices have not been nearly so successful as the results obtained by expert manual thumbing of the reel spool. The present invention provides an anti-backlash device which may be attached to any reel of standard construction and which automatically thumbs the line on the spool.

One object of this invention is to provide an anti-backlash device for fishing reels which is attachable to and detachable from a standard fishing reel without the necessity of building it into the reel during manufacture.

Another object is to provide an anti-backlash device for fishing reels which automatically applies a predetermined and adjustable tension to the fishing line wound on the spool as the bait or lure is being cast.

Another object is to provide an anti-backlash device for fishing reels of the foregoing character having a thumb rest thereon for applying additional pressure or for applying sufficient pressure to halt the spool and cause the bail or lure to be deposited at any desired point in the water.

Another object is to provide an anti-backlash device for fishing reels which applies a yielding pressure to the line on the spool, the pressure being greater when the spool is full of line at the time the lure or bait leaves the casting rod and decreasing automatically as the lure or bait approaches its destination.

Another object is to provide an anti-backlash device for fishing reels which automatically provides a thumbing of the reel spool without necessity of skill on the part of the operator as has hitherto been practised by experts with long experience manually thumbing their reel spools to apply such pressure thereto, as the lure or bait is being cast.

Another object is to provide an anti-backlash device for fishing reels which is of simple design and consequently of low cost of manufacture, thereby bringing it within the reach of all fishermen.

Figure 1:
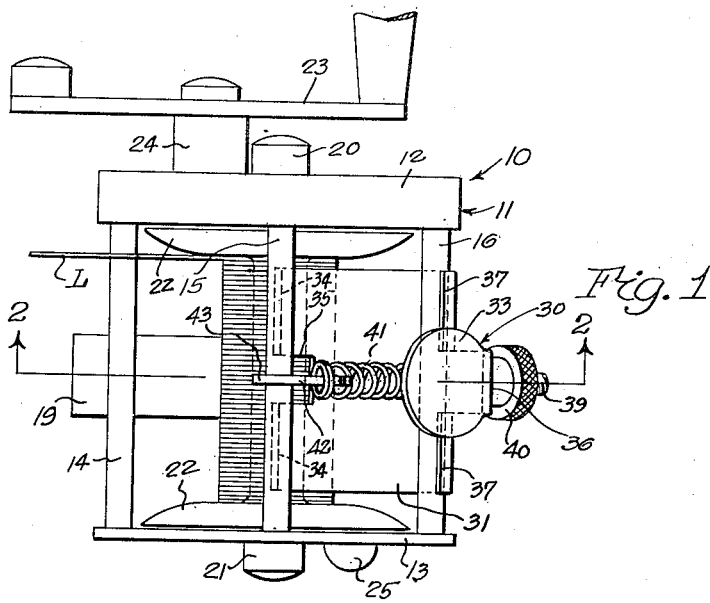
Figure 1 is a top plan view of a fishing reel showing an anti-backlash device of the present invention applied thereto.
Figures 2, 3:
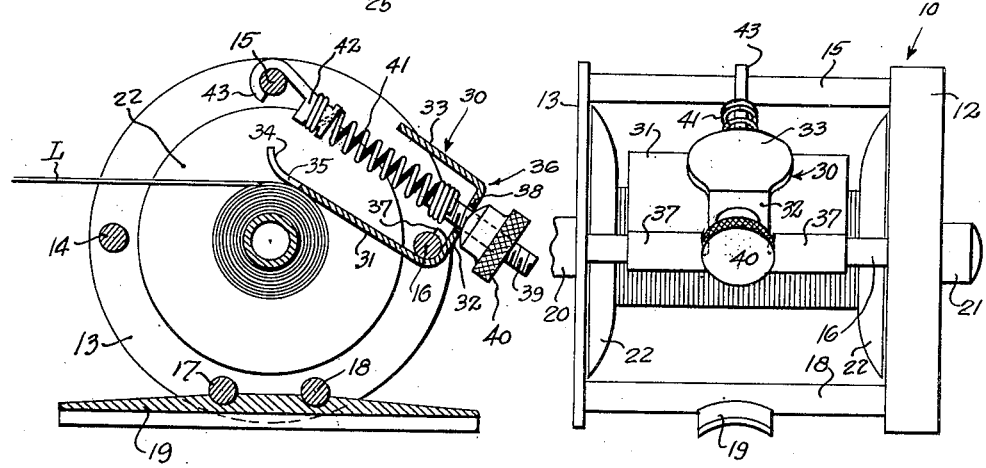
Figure 2 is a vertical section taken along the line 2—2 in Figure 1.
Figure 3 is a rear elevation of the fishing reel and anti-backlash device shown in Figure 1.

Referring to the drawings in detail, Figure 1 shows a fishing reel, generally designated 10, of a conventional type having the usual frame 11 consisting of end members 12 and 13 interconnected by cross-bars or tie bars 14, 15 and 16 and having tie bars 17 and 18 at the bottom thereof (Figure 2) to which is attached the usual elongated reel attachment plate 19 of arcuate cross-section (Figure 3). Rotatably mounted in bearings 20 and 21 attached to the end members 12 and 13 respectively is a line spool 22 upon which the line L is wound, the spool 22 being rotated by mechanism (not shown) within the end member 12 through the agency of the usual hand crank 23 mounted upon the post 24. A slidable button 25 applies the usual drag to the spool, if it is desired by the fisherman. The foregoing parts are conventional and their details are beyond the scope of the present invention.

The anti-backlash device or attachment, generally designated 30, of the present invention consists of a pressure plate 31 of brass or other suitable material having a bent-up portion 32 terminating in a thumb rest 33 parallel to the plate 31, the forward edge of which is curved upward as at 34 (Figure 2) and provided with a notch 35. The portions 31, 32 and 33 are thus of approximately U-shaped cross-section (Figure 2) and in assembly constitute a pressure applicator, generally designated 36.

The upwardly bent or bridge portion 32 between the plate 31 and the thumb rest 33 is very narrow in proportion to the width of the plate 31. On either side of the bridge portion 32 the rearward edges of the plate 31 are bent into approximately semi-cylindrical portions 37 of approximately the same radius of curvature as the cross bar 16, so as to partially encircle the latter and pivotally engage it.

The bridge portion 32 is provided with a central aperture 38 (Figure 2) through which passes the threaded portion of a screw 39 carrying a thumb nut 40. The inner end of the screw 39 is attached, in any suitable manner, to the lower end of a helical tension spring 41, the upper end of which is attached to the butt 42 of a hook 43 which is adapted to snap over the cross bar 15. While the drawings show a separate hook 43, it will be obvious that the upper end of the spring 41 may itself be bent to provide such a hook integral with the spring 41 itself, as shown at 48 in Figure 4. The notch 35 is provided in the central forward edge of the pressure plate 31 to enable the latter to swing upward a greater distance without colliding with the hook 43 or spring 41.

Figure 4:
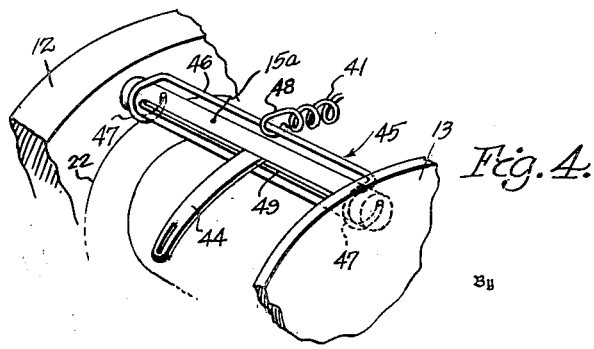
Figure 4 is a perspective view of a slightly modified device employing an adapter which is particularly applicable to level wind reels.

The modification shown in Figure 4 is adapted for use with so-called level-wind reels wherein the cross bar 15a corresponding to the cross bar 15 of Figure 2 is slotted for the travel to and fro of a line guide 44 which distributes the line evenly upon the spool as the reel is wound up. A spring anchorage 45 is provided in order to attach the upper end of the spring 41 without conflicting with the travel of the line guide 44. The spring anchorage 45 consists of an elongated member 46 of wire or the like which is substantially the length of the cross bar 15a and which has its opposite ends bent as at 47 in partially circular paths in order to grip the opposite ends of the cross bar 15a adjacent their junctions with the end members 12 and 13. The hook portion 48 on the upper end of the spring 41 is connected to the elongated member 46 immediately behind the cross bar 15a, leaving the line guide 44 free to travel to and fro in its slot 49 without interference.

In the use of the anti-backlash device or attachment 30, the device is attached to the reel by passing the pressure applicator 36 upward and forward so that the bar 16 enters between the plate 31 and thumb rest 33 (Figure 2), and the semi-circularly bent portions 37 pivotally engage the cross bar 16. The hook 43 is then hooked over the cross bar 15, or (Figure 4) the hook portion 48 of the spring 41 is hooked over the spring anchorage 45, the ends 47 of which are then hooked over the cross bar 15. The fisherman then screws the nut 40 to and fro along the screw 39 until the desired pressure is applied by the plate 31 against the line L around the spool 22. The device 30 then acts like a bell-crank with the spring 41 pulling upon the bent portion 32 to force the pressure plate 31 against the line L on the spool 22.

The fisherman makes the cast in the usual way, and as the line L unwinds from the spool 22, the pressure exerted by the pressure plate 31 upon the line L decreases, in conformity with the desired action. The user of the device can temporarily apply greater pressure to the line L, if he so desires, by pressing downward with his thumb on the thumb rest 33. At the end of the cast or when the bait or lure has reached the desired position, the fisherman can apply sufficient pressure in this manner to halt the rotation of the spool 22 instantly and cause the lure to drop into the water at the desired point. In this manner, the spool 22 and the line L upon it can be easily and automatically thumbed by a inexperienced fisherman, and the backlash or snarls ordinarily encountered completely prevented. By unhooking the hook 43 or 48 from the cross bar 15 or 15a, the device can be instantly detached from the reel and placed in the tackle box or otherwise stored until casting is resumed.

What I claim is:

An anti-backlash attachment adapted to be mounted on the cross bars of a fishing reel, said attachment comprising a pressure applicator having a pivot portion pivotally attachable to one of said cross bars and having a line contact portion engageable with the line on said reel, a pressure adjusting screw threadedly mounted on said applicator, and a resilient element yieldingly connecting said adjusting screw of said applicator to another of said cross bars and yieldingly pressing said contact portion against the line on said reel.

EDWARD W. PETERSON.

REFERENCES CITED

The following references are of record in the file of this patent:

UNITED STATES PATENTS

| Number | Name | Date |
|---|---|---|
| 1,379,692 | Pflueger | May 31, 1921 |
| 1,544,128 | Budd et al. | June 30, 1925 |
| 2,257,521 | Babcock | Sept. 30, 1941 |
| 2,341,073 | Babcock | Feb. 8, 1944 |